3,179,658
2-OXA STEROIDS AND PROCESSES OF
PREPARING THE SAME
Ralph F. Hirschmann, Scotch Plains, N.J., and Nathan G. Steinberg, Brooklyn, N.Y., assignors to Merck & Co., Inc., Rahway, N.J., a corporation of New Jersey
No Drawing. Filed May 26, 1961, Ser. No. 112,797
19 Claims. (Cl. 260—239.55)

This invention is concerned generally with novel 2-oxa-steroids and with processes of preparing the same. More particularly, it relates to novel 2-oxa-11-oxygenated-17α, 21-dihydroxy-4-pregnene-3,20-dione compounds and to the process of preparing these compounds starting with the corresponding 17α,21-dihydroxy-11-oxygenated-1,4-pregnadiene-3,20-dione.

These novel 2-oxa-11-oxygenated-17α,21-dihydroxy-4-pregnene-3,20-dione compounds, subject of the present invention, may be chemically represented as follows:

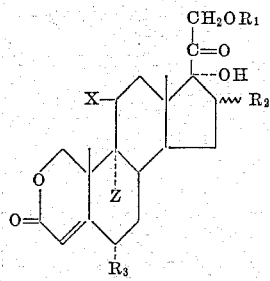

wherein $R_1$ is hydrogen or an acyl group, $R_2$ stands for hydrogen, α-methyl or β-methyl, $R_3$ is hydrogen, methyl, chloro or fluoro, X stands for a keto or 11-hydroxy group, and Z is hydrogen or halogen.

These novel 2-oxa-11-oxygenated-17α,21-dihydroxy-4-pregnene-3,20-dione compounds possess cortisone-like activity, and are valuable for the alleviation of inflammatory conditions such as arthritis and related diseases. The novel intermediates and related compounds which are also described in this invention are members of a class of compounds some members of which have cortisone-like activity.

In preparing our novel chemical compounds, the starting material utilized is a 17α,21-dihydroxy-1,4-pregnadiene-3,11,20-trione compound which is designated as (I) on Flow Sheet A.

As starting materials in our process, we employ
17α,21-dihydroxy-1,4-pregnadiene-3,11,20-trione,
17α,21-dihydroxy-16α-methyl-1,4-pregnadiene-3,11,20-trione,
17α,21-dihydroxy-16β-methyl-1,4-pregnadiene-3,11,20-trione,
17α,21-dihydroxy-6α-methyl-1,4-pregnadiene-3,11,20-trione,
6α-fluoro-17α,21-dihydroxy-1,4-pregnadiene-3,11,20-trione,
6α-chloro-17α,21-dihydroxy-1,4-pregnadiene-3,11,20-trione,
6α-chloro-17α,21-dihydroxy-16α-methyl-1,4-pregnadiene-3,11,20-trione,
6α-chloro-17α,21-dihydroxy-16β-methyl-1,4-pregnadiene-3,20-dione,
6α-fluoro-17α,21-dihydroxy-16α-methyl-1,4-pregnadiene-3,11,20-trione,
6α-fluoro-17α,21-dihydroxy-16β-methyl-1,4-pregnadiene-3,11,20-trione,
17α,21-dihydroxy-6α,16α-dimethyl-1,4-pregnadiene-3,11,20-trione,
17α,21-dihydroxy-6α,16β-dimethyl-1,4-pregnadiene-3,11,20-trione.

It has been found that the starting materials defined above will react with an aqueous acidic formaldehyde solution to form a 17α,20,20,21-bis(methylenedioxy)-1,4-pregnadiene-3,11-dione compound which is designated on Flow Sheet A as (II). The latter compound is then reacted with osmium tetroxide to form the 17α,20,20,21-bis(methylenedioxy) - 1ξ,2ξ - dihydroxy-4-pregnene-3,11-dione compound (III). To carry out this process a solution of the steroid in a solvent such as pyridine, cooled to about 5° C., is treated with a solution of osmium tetroxide in pyridine. The mixture is allowed to stand for several days, whereupon it is added with stirring to a solvent such as petroleum ether. The crude osmate ester is isolated by filtration. It is then dissolved in dioxane and kept at about 0° C. while a slow stream of hydrogen sulfide is bubbled thru. The precipitated osmium dioxide is removed by filtration and the steroid product (III) is recovered from the filtrate.

The 17α,20,20,21-bis(methylenedioxy)-1ξ,2ξ-dihydroxy-4-pregnene-3,11-dione (III) is converted into 17α,20,20,21 - bis(methylenedioxy)-11β-hydroxy-2-oxa-4-pregnene-3-one (VI) by reacting with lead tetraacetate to cleave the A-ring of the steroid on both sides of carbon 2, forming the aldehyde-ester (IV), which on treatment with an alkali such as sodium hydroxide gives the sodium salt (V). The latter compound is then reduced with sodium borohydride to give the 17α,20,20,21-bis(methylenedioxy)-11β-hydroxy-2-oxa-4-pregnene-3-one (VI).

Compounds (III), (IV) and (V) can be converted into the 17α,20,20,21-bis(methylenedioxy)-1ξ-hydroxy-2-oxa-4-pregnene-3,11-dione (IVA) by reaction with the reagent indicated on Flow Sheet A, but the latter compound is not converted into the desired 17α,20,20,21-bis(methylenedioxy)-11β-hydroxy-2-oxa-4-pregnene-3-one (VI) with sodium borohydride. The structure of (IVA) is supported by its modes of preparation and by its conversion to 17α,20,20,21 - bis(methylenedioxy) - 1ξ - chloro-2-oxa-4-pregnene-3,11-dione and the reverse transformation (see Flow Sheet B and Example 8). The structure of the aldehyde ester (IV) is strongly supported by spectral data and by its relationship to (IVA) as shown in Flow Sheet B, experimental details for which are given in Example 9. While we prefer the β-configuration for the OH at the 1-position in compound IVA, it is to be understood that no part of the specification will be materially defective if it should later be established that this hydroxy group has an α-configuration.

Upon treatment of a 17α,20,20,21-bis(methylenedioxy)-11β-hydroxy-2-oxa-4-pregnene-3-one with a dilute organic acid, for example, a 60% solution of formic acid, the 17α,20,20,21-bis(methylenedioxy)-protecting group is removed and there is obtained the corresponding 11β,17α,21-trihydroxy-2-oxa-4-pregnene-3,20-dione. The latter can be converted to the corresponding 21-acylate by treating with an acylating agent, e.g. a lower hydrocarbon carboxylic acid acylating agent such as benzoic anhydride or tertiary butyl acetyl chloride; a lower alkanoic anhydride or lower alkanoyl halide such as acetic anhydride, propionic anhydride or acetyl chloride; a polybasic acid anhydride such as β,β-dimethylglutaric anhydride, succinic anhydride and the like.

The products formed by this process from the designated starting materials include:
11β,17α,21-trihydroxy-2-oxa-4-pregnene-3,20-dione,
16α - methyl - 11β,17α,21 - trihydroxy - 2 - oxa - 4-pregnene-3,20-dione,
16β - methyl - 11β,17α,21 - trihydroxy - 2 - oxa - 4-pregnene-3,20-dione,
6α - methyl - 11β,17α,21 - trihydroxy - 2 - oxa - 4 - pregnene-3,20-dione, 6α - fluoro - 11β,17α,21 - trihydroxy-2-oxa-4-pregnene-3,20-dione, 6α - chloro - 11β,17α,21 - trihydroxy-2-oxa-4-pregnene-3,20-dione, 6α - chloro - 16α - methyl - 11β,17α,21 - trihydroxy - 2-oxa-4-pregene-3,20-dione, 6α - chloro - 16β - methyl - 11β,17α,21 - trihydroxy - 2-oxa-4-pregnene-3,20-dione, 6α - fluoro - 16α - methyl - 11β,17α,21 - trihydroxy - 2-oxa-4-pregnene-3,20-dione, 6α - fluoro - 16β - methyl - 11β,17α,21 - trihydroxy - 2-oxa-4-pregnene-3,20-dione, 6α,16α - dimethyl - 11β,17α,21 - trihydroxy - 2 - oxa - 4-pregnene-3,20-dione, 6α,16β - dimethyl - 11β,17α,21 - trihydroxy - 2 - oxa - 4-pregnene-3,20-dione, and the 21-acylates thereof.

The above 11β-hydroxy-steroids are converted to the corresponding 11-keto-steroid on oxidation with chromium trioxide using the procedure of Example 15.

To prepare the 9α-halogen-11β,17α,21-trihydroxy-2-oxa-4-pregnene-3,20-diones the preferred starting materials utilized are the 9,11β-epoxy-17α,21-dihydroxy-1,4-pregnadiene-3,20-dione compounds, which are designated (I') on Flow Sheet C.

The above named starting material will react with formaldehyde and concentrated hydrobromic acid to form a 17α,20,20,21 - bis(methylenedioxy) - 9α - bromo - 11β-hydroxy-1,4-pregnadiene-3-one (II'). This compound is then converted to the 9,11β-epoxy-derivative (IIA') by treating with sodium methoxide in methanol. Oxidation of the 17α,20,20,21 - bis(methylenedioxy) - 9,11β - epoxy-1,4-pregnadiene-3-one (IIA') with osmium tetroxide in the manner described above for compound (II) of Flow Sheet A gives a mixture of 1ξ,2ξ-dihydroxy-17α,20,20,21-bis(methylenedioxy) - 9,11β - epoxy - 4 - pregnene - 3 - one (IIIA') and 4ξ,5ξ - dihydroxy - 17α,20,20,21 - bis-(methylenedioxy)-9,11β-epoxy-1-pregnene-3-one (IIIB'), which compounds are separated by chromatography.

The 1ξ,2ξ-dihydroxy compound (IIIA') is then converted into the 17α,20,20,21 - bis(methylenedioxy) - 9,11β - epoxy - 2 - oxa - 4 - pregnene - 3 - one (VI') by reacting with sodium metaperiodate to form compound (IV'), which on treatment with an alkali such as sodium hydroxide gives the sodium salt of the aldehyd acid (V'). The latter compound is then reduced with sodium borohydride to give the 17α,20,20,21-bis(methylenedioxy)-9,11β - epoxy - 2 - oxa - 4 - pregnene - 3 - one (VI').

Upon treatment of a solution of 17α,20,20,21-bis-(methylenedioxy) - 9,11β - epoxy - 2 - oxa - 4 - pregnene-3-one (VI') with an aqueous solution of hydrobromic or hydrochloric acid there is formed the corresponding 9α-bromo- or 9α-chloro-11β,17α,21-trihydroxy-2-oxa-4-pregnene-3,20-dione (VII') which can be converted into the corresponding 21-acylate (VIII') by treating with an acylating agent such as is described in column 2. The 9α-fluoro - 11β,17α,21 - trihydroxy - 2 - oxa - 4 - pregnene-3,20-dione is prepared by treatment of the 9α-chloro-11β,17α,21 - trihydroxy - 2 - oxa - 4 - pregnene - 3,20-dione 21-acetate (VIII') with sodium methylate to form the 9,11β - epoxy - 17α,21 - dihydroxy - 2 - oxa - 4-pregnene-3,20-dione. The latter compound is then reacted with anhydrous hydrogen fluoride in tetrahydrofuran to afford the 9α - fluoro - 11β,17α,21 - trihydroxy - 2 - oxa-4-pregnene-3,20-dione which can be converted into the corresponding 21-acylate on treating with an acylating agent such as is described in column 2.

The products formed from the above described starting materials include:

9α - fluoro - 11β,17α,21 - trihydroxy - 2 - oxa - 4 - pregnene-3,20-dione,

9α - fluoro - 11β,17α,21 - trihydroxy - 16α - methyl - 2-oxa-4-pregnene-3,20-dione, 9α - fluoro - 11β,17α,21 - trihydroxy - 16β - methyl - 2-oxa-4-pregnene-3,20-dione, 9α - fluoro - 11β,17α,21 - trihydroxy - 6α - methyl - 2-oxa-4-pregnene-3,20-dione, 6α,9α - difluoro - 11β,17α,21 - trihydroxy - 2 - oxa - 4-pregnene-3,20-dione, 6α - chloro - 9α - fluoro - 11β,17α,21 - trihydroxy - 2-oxa-4-pregnene-3,20-dione, 6α - chloro - 9α - fluoro - 11β,17α,21 - trihydroxy - 16α-methyl-2-oxa-4-pregnene-3,20-dione, 6α - chloro - 9α - fluoro - 11β,17α,21 - trihydroxy - 16β-methyl-2-oxa-4-pregnene-3,20-dione, 6α,9α - difluoro - 11β,17α,21 - trihydroxy - 16α - methyl-2-oxa-4-pregnene-3,20-dione, 6α,9α - difluoro - 11β,17α,21 - trihydroxy - 16β - methyl-2-oxa-4-pregnene-3,20-dione, 9α - fluoro - 11β,17α,21 - trihydroxy - 6α,16α - dimethyl-2-oxa-4-pregnene-3,20-dione, 9α - fluoro - 11β,17α,21 - trihydroxy - 6α,16β - dimethyl-2-oxa-4-pregnene-3,20-dione;

9α - chloro - 11β,17α,21 - trihydroxy - 2 - oxa - 4-pregnene-3,20-dione,

9α - chloro - 11β,17α,21 - trihydroxy - 16α - methyl - 2-oxa-4-pregnene-3,20-dione, 9α - chloro - 11β,17α,21 - trihydroxy - 16β - methyl - 2-oxa-4-pregnene-3,20-dione, 9α - chloro - 11β,17α,21 - trihydroxy - 6α - methyl - 2-oxa-4-pregnene-3,20-dione, 9α - chloro - 6α - fluoro - 11β,17α,21 - trihydroxy - 2-oxa-4-pregnene-3,20-dione, 6α,9α - dichloro - 11β,17α,21 - trihydroxy - 2 - oxa - 4-pregnene-3,20-dione, 6α,9α - dichloro - 11β,17α,21 - trihydroxy - 16α - methyl-2-oxa-4-pregnene-3,20-dione, 6α,9α - dichloro - 11β,17α,21 - trihydroxy - 16β - methyl-2-oxa-4-pregnene-3,20-dione, 9α - chloro - 6α - fluoro - 11β,17α,21 - trihydroxy - 16α-methyl-2-oxa-4-pregnene-3,20-dione, 9α - chloro - 6α - fluoro - 11β,17α,21 - trihydroxy - 16β-methyl-2-oxa-4-pregnene-3,20-dione, 9α - chloro - 11β,17α,21 - trihydroxy - 6α,16α - dimethyl-2-oxa-4-pregnene-3,20-dione, 9α - chloro - 11β,17α,21 - trihydroxy - 6α,16β - dimethyl-2-oxa-4-pregnene-3,20-dione;

9α - bromo - 11β,17α,21 - trihydroxy - 2 - oxa-4-pregnene-3,20-dione,

9α - bromo - 11β,17α,21 - trihydroxy - 16α - methyl - 2-oxa-4-pregnene-3,20-dione, 9α - bromo - 11β,17α,21 - trihydroxy - 16β - methyl - 2-oxa-4-pregnene-3,20-dione, 9α - bromo - 11β,17α,21 - trihydroxy - 6α - methyl - 2-oxa-4-pregnene-3,20-dione, 9α - bromo - 6α - fluoro - 11β,17α,21 - trihydroxy - 2-oxa-4-pregnene-3,20-dione, 9α - bromo - 6α - chloro - 11β,17α,21 - trihydroxy - 2-oxa-4-pregnene-3,20-dione, 9α - bromo - 6α - chloro - 11β,17α,21 - trihydroxy - 16α-methyl-2-oxa-4-pregnene-3,20-dione, 9α - bromo - 6α - chloro - 11β,17α,21 - trihydroxy - 16β-methyl-2-oxa-4-pregnene-3,20-dione, 9α - bromo - 6α - fluoro - 11β,17α,21 - trihydroxy - 16α-methyl-2-oxa-4-pregnene-3,20-dione, 9α - bromo - 6α - fluoro - 11β,17α,21 - trihydroxy - 16β-methyl-2-oxa-4-pregnene-3,20-dione, 9α - bromo - 11β,17α,21 - trihydroxy - 6α,16α - dimethyl-2-oxa-4-pregnene-3,20-dione, 9α - bromo - 11β,17α,21 - trihydroxy - 6α,16β - dimethyl-2-oxa-4-pregnene-3,20-dione, and the 21-acylate derivatives thereof.

The above 11β-hydroxy-steroids are converted to the corresponding 11-keto-steroid on oxidation with chromium trioxide using the procedure of Example 15.

When 9α - halo - 11β,17α,21 - trihydroxy - 1,4 - pregnadiene-3,20-dione compounds are used as starting materials in the synthesis described above, there are formed as products the corresponding 4-oxa-steroids, in place of the 2-oxa-steroids. For example, when 9α-fluoro-11β,17α, 21 - trihydroxy - 16α - methyl - 1,4 - pregnadiene - 3,20-dione is reacted with an aqueous acidic solution of formaldehyde there is formed 17α,20,20,21-bis(methylenedioxy) - 9α - fluoro - 11β - hydroxy - 16α - methyl - 1,4-pregnadiene-3-one (Flow Sheet D), which on oxidation with osmium tetroxide gives 17α,20,20,21-bis(methylenedioxy) - 9α - fluoro - 4ξ,5ξ - dihydroxy-16α - methyl - 1-pregnene-3,11-dione. The latter compound, on reaction with lead tetraacetate according to the conditions set forth in Example 18 gives a compound $C_{24}H_{31}O_8F$, which is compound IVA″ or IVB″ of Flow Sheet D. Treatment of the latter compound with sodium hydroxide and then with sodium borohydride gives 17α,20,20,21-bis(methylenedioxy) - 11β - hydroxy - 9α - fluoro - 16α - methyl - 4-oxa - 1 - pregnene - 3 - one. Removal of the protecting bis(methylenedioxy) group using dilute acid gives the 9α - fluoro - 11β,17α,21-trihydroxy - 16α - methyl - 4 - oxa - 1 - pregnene - 3,20 - dione. The latter compound can be converted into the corresponding 21 acylate by treatment with an acylating agent.

Treatment of the compound IVA″ or IVB″ of Flow Sheet D first with sodium hydroxide and then with hydrochloric acid gives 17α,20,20,21-bis(methylenedioxy)-9α-fluoro-5ξ-hydroxy-16α-methyl-1-pregnene-3,11-dione.

FLOW SHEET A

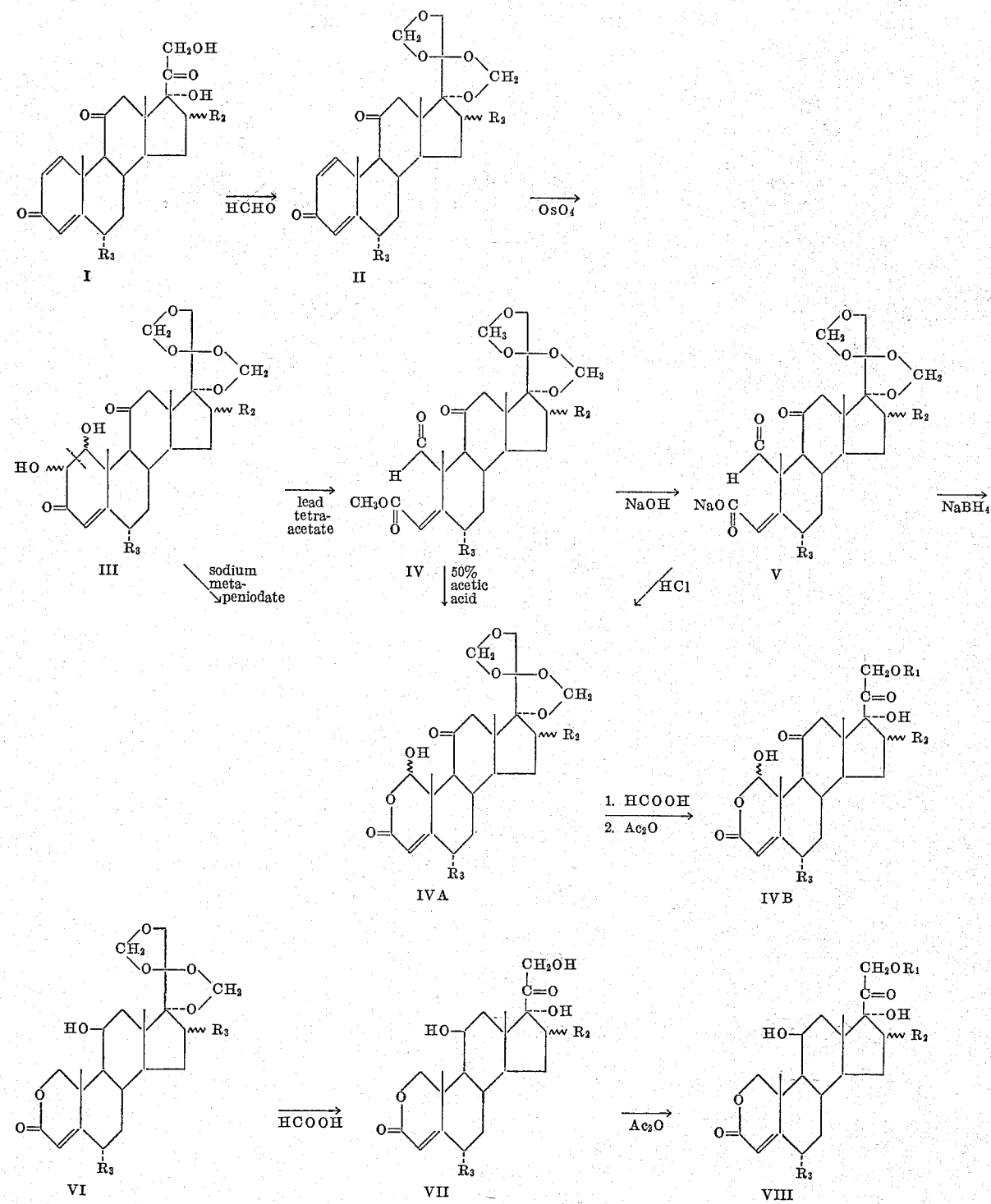

$R_1$ is acyl, $R_2$ is hydrogen, α-methyl or β-methyl, $R_3$ is hydrogen, methyl, fluoro or chloro.

FLOW SHEET B
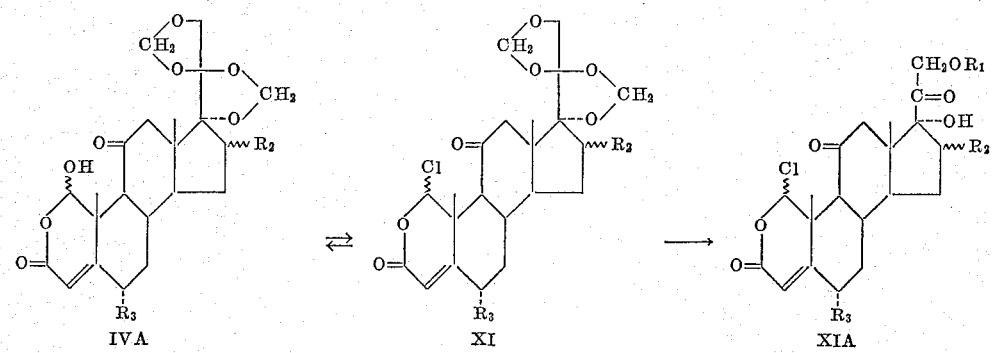
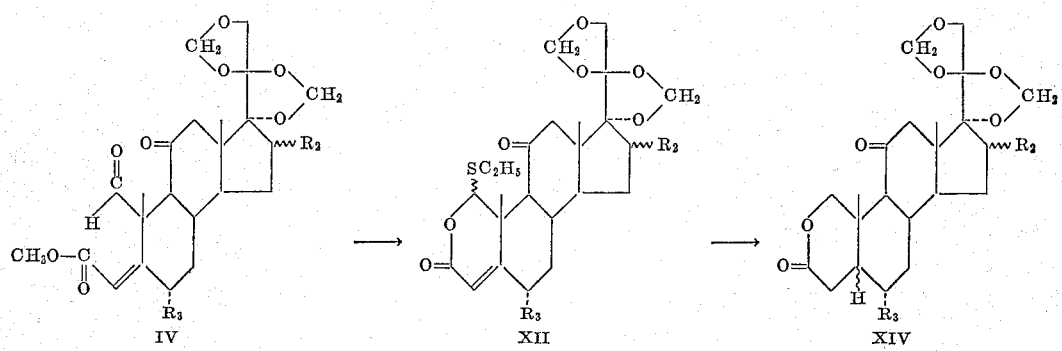
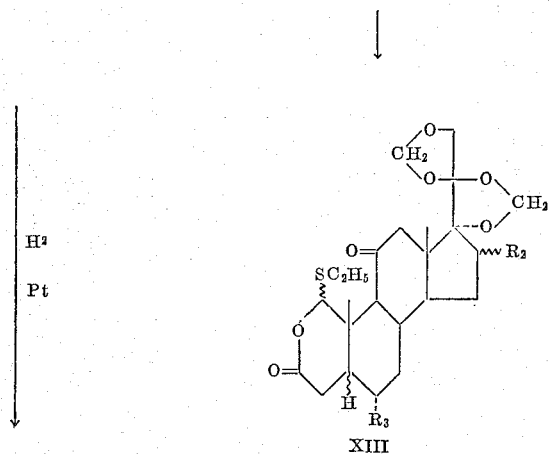
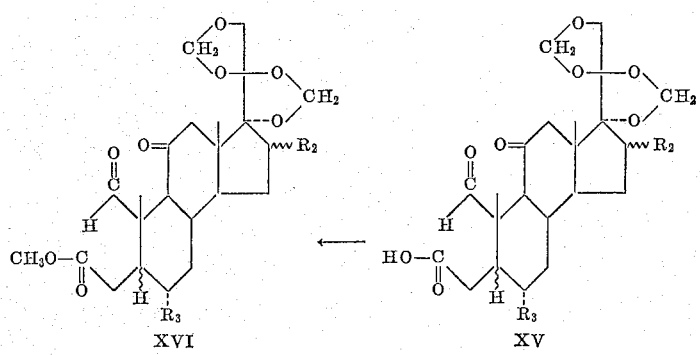

FLOW SHEET C
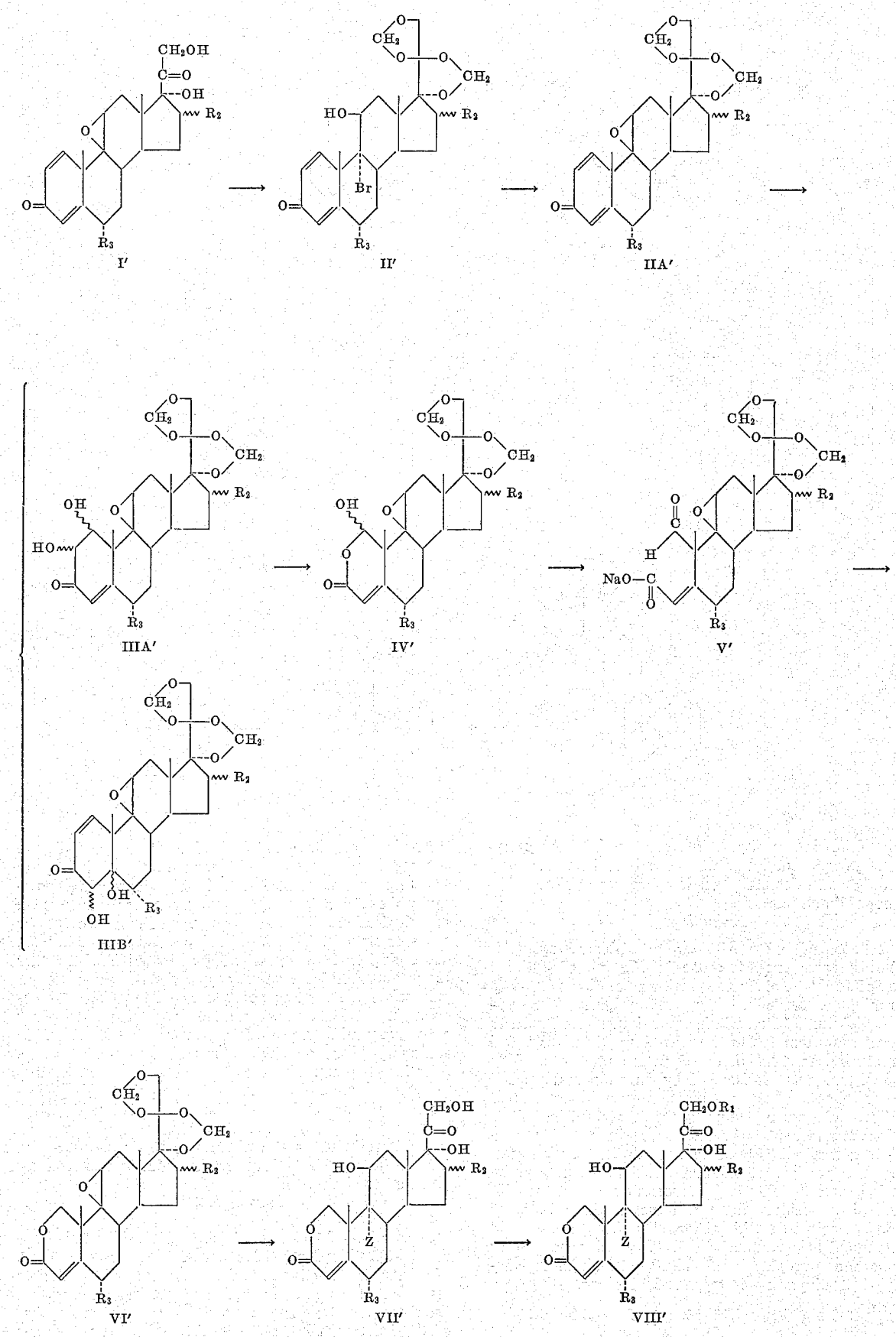
Z is chloro or bromo, R₁ is acyl, R₂ is hydrogen, α-methyl or β-methyl, R₃ is hydrogen, methyl, fluoro or chloro.

FLOW SHEET D

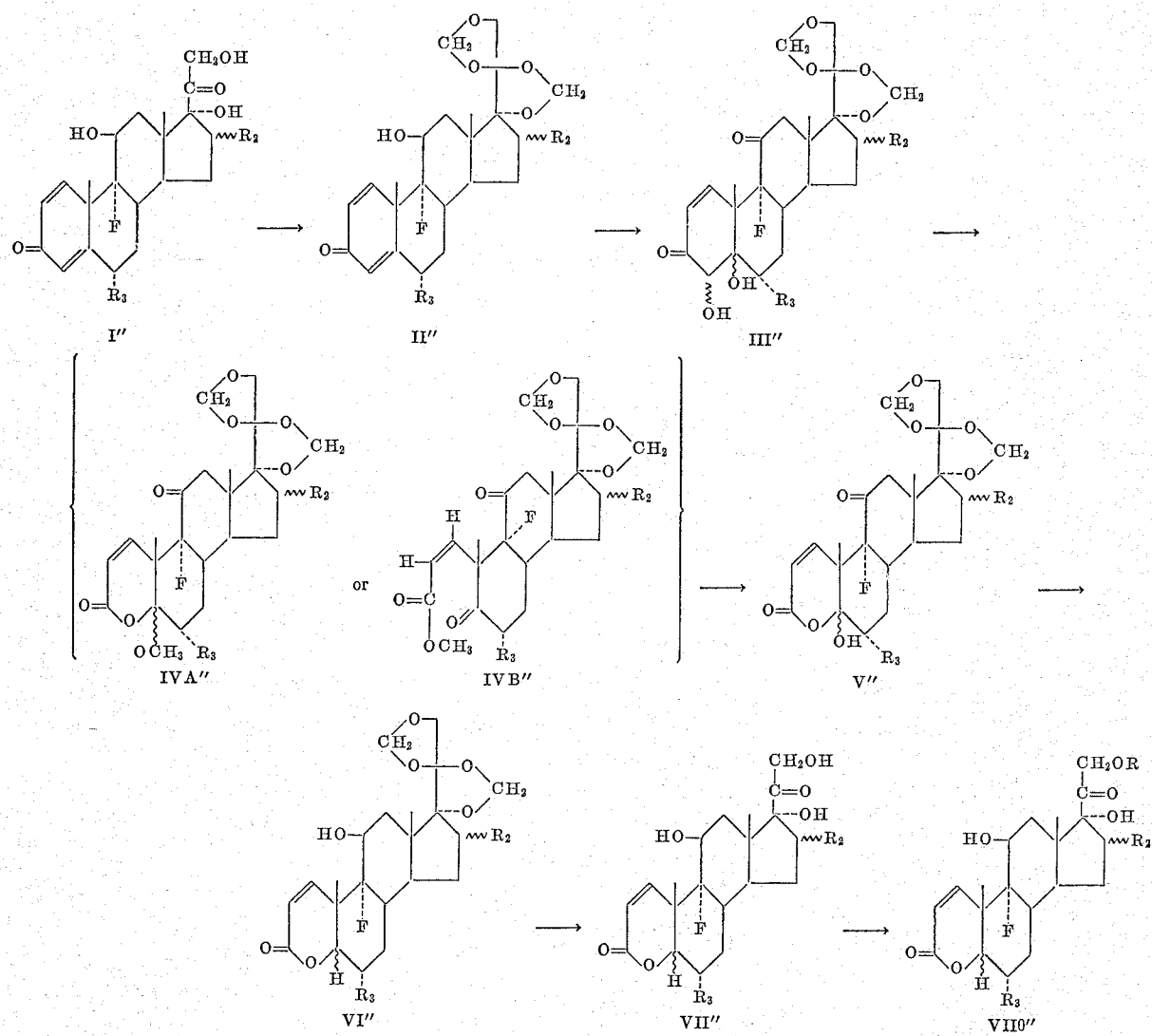

The following examples illustrate methods of carrying out the present invention but it is to be understood that these examples are given for purposes of illustration and not of limitation.

Example 1

A solution of 100 g. of 17α,20,20,21-bis(methylenedioxy)-1,4-pregnadiene-3,11-dione in 720 ml. of pyridine is cooled to 5° C. and treated with a solution of 69.9 g. of osmium tetroxide in 408 ml. of pyridine. The mixture, which turns black within five minutes, is allowed to stand at room temperature for five days when it is added with stirring to 13.4 liters of petroleum ether. The crude osmate ester is isolated by filtration and washed with petroleum ether to remove most of the residual pyridine. The crude product is then dissolved in 8 liters of dioxane and kept in an ice-bath while a slow stream of hydrogen sulfide is bubbled through the reaction mixture. The precipitated osmium dioxide is removed by filtration, and the filtrate is concentrated to dryness in vacuo. The residual foam is dissolved in 2 liters of acetone, decolorized with activated carbon, filtered and concentrated to a volume of 1 liter. Addition of 1 liter of n-hexane affords 38 g. of 17α,20,20,21-bis(methylenedioxy)-1ξ,2ξ-dihydroxy-4-pregnene-3,11 1dione, $\lambda_{max}^{CH_3OH}$ 236 mµ (log e 4.15); $\lambda_{max}^{CHCl_3}$ 2.85, 5.95, 6.15 5.85–5.90 sh. µ; λmax. 9–9.2µ.

When inserted into a melting point bath at 200° C., the compound undergoes an immediate change in crystal structure and melts at 232–234° C. Paper chromatography shows this does not involve a chemical change such as dehydration. The mother liquor affords two further crops of crystals, M.P. 228–230° C., and 227–228.5° C., amounting to 3.48 and 10.55 g., respectively. Further recrystallization of the first crop from the same solvent pair raises the melting point to 244–245° C. (70% recovery). An analytical sample is obtained by paper chromatography using methanol-formamide (2:1) as the stationary phase and chloroform as the mobile phase. Isolation by crystallization from acetone-n-hexane does not give a sample of improved melting point. *Analysis.*—Calculated for $C_{27}H_{30}O_8 \cdot C_3H_6O$: C, 63.40; H, 7.37. Found: C, 63.84; H, 7.35. The compound gives a positive tetrazolium test and a negative ferric chloride test. The extinction of the former is about two-thirds that given by cortisone.

Example 2

A solution of 434 mg. of 17α,20,20,21-bis(methylenedioxy)-1ξ,2ξ-dihydroxy-4-pregnene-3,11-dione in 100 ml. of ethanol is treated with 1.72 g. of sodium metaperiodate dissolved in 10 ml. of water and allowed to stand at room temperature for about sixty hours. After removal of the solvents, the residue is distributed between ether and water. The organic layer is washed with an aqueous solution of sodium thiosulfate and again with water, and then dried over magnesium sulfate. The crude product, amounting to 300 mg., is dissolved in 60 ml. of a (5:1) mixture of benzene and ether, adsorbed on 15 g. of acid-washed alumina and eluted successively with benzene-ether (5:1, 1:1), ether and then with ether-acetone (9:1). The last-named system affords, after recrystallization from methanol, 77 mg. of 17α,20,20,21-bis(methylenedioxy) - 1ξ - hydroxy - 2 - oxa - 4 - pregnene-3,11-dione, M.P. 230–233° C. An analytical sample obtained by recrystallization from methanol melts at 232–234° C., λmax. 224 $m\mu$ ($\epsilon$ = 14,500), $\lambda_{max.}^{CHCl_3}$ 2.9–3.0$\mu$, 5.79$\mu$ 5.87$\mu$, 6.1–6.2 (weak) $\mu$, 9–9.2$\mu$.

*Analysis.*—Calculated for $C_{22}H_{28}O_8$: C, 62.84; H, 6.71. Found: C, 62.95; H, 6.59.

This material is far less mobile by paper chromatography than the ester-aldehyde IV (see Flow Sheet A) showing $r_f$ [methanol: formamide(2:1):benzene] 0.17.

Example 3

A solution of 4.0 mg. of 17α,20,20,21-bis(methylenedioxy)-1ξ,2ξ-dihydroxy-4-pregnene-3,11-dione in 262 ml. of benzene and 523 ml. of methanol is treated with 11.6 g. of lead tetraacetate for 18 hours at room temperature. After addition of the oxidizing agent, the mixture acquires a red color which disappears on standing. An equal volume of benzene is added and the mixture is then washed several times with water. Removal of the solvent and crystallization from methanol affords 2.48 g. of the esteraldehyde IV (see Flow Sheet A), M.P. 227–228° C., $r_f$ [methanol-formamide(2:1):benzene] 0.9. An analytical sample, M.P. 231–236° C., λmax. 222 $m\mu$ ($\epsilon$ = 9,450), is obtained by recrystallization from methanol. *Analysis.*—Calculated for $C_{23}H_{30}O_8$: C, 63.58; H, 6.96; $OCH_3$, 7.2. Found: C, 63.22; H, 6.77; $OCH_3$, 7.07. Nuclear magnetic resonance from benzene reveals an aldehydic proton at 140.5 cycles.

A solution of 1.71 g. of IV (see Flow Sheet A), M.P. 228–231° C., is suspended in 32.4 ml. of 50% (by volume) aqueous acetic acid and heated on a steam bath for one and one-half hours. The resulting solution is cooled and poured into 300 ml. of water. The mixture is chilled in an ice bath and the product, 17α,20,20,21-bis(methylenedioxy)-1ξ-hydroxy-2-oxa - 4 - pregnene-3,11-dione, (1.435 g.) is isolated by filtration. The material, M.P. 227–229° C. is identical with the product from the sodium metaperiodate oxidation described in Example 2.

A mixture of 100 mg. of 17α,20,20,21-bis(methylenedioxy)-1ξ-hydroxy-2-oxa-4-pregene-3,11-dione M.P. 224–226° C. and 500 mg. of silver oxide and about 15 ml. of methyl iodide is refluxed with constant stirring for six hours. The mixture is filtered and the filtrate is taken to dryness. The crude product is found to be single spot material by paper chromatography using the formamide-benzene:n-hexane (1:1) system. The mobility of the crude product is the same as that of the ester-aldehyde IV (see Flow Sheet A). Crystallization from methanol gives 65.5 mg. of a crystalline produce, M.P. 228–230° C.

$\lambda_{max.}^{MeOH}$ 220, E% 212

The infrared spectrum of this crystalline product is the same as that of the ester-aldehyde IV (see Flow Sheet A).

Example 4

A 125 mg. sample of the aldehyde-ester (IV), the structure of which is shown in Flow Sheet A, is dissolved in 10 ml. of methanol with heating. Addition of 4 ml. of 0.11 N sodium hydroxide gives a precipitate which redissolves on heating. The homogeneous mixture is kept at room temperature over night. After removal of the bulk of the methanol in vacuo at room temperature the aqueous solution of the sodium salt (V) the structure of which is shown in Flow Sheet B is made acid with cold 2.5 N hydrochloric acid. The resulting product, M.P. 219–221° C., λmax. 223 $m\mu$ ($\epsilon$ = 13,000), is removed by filtration. The product is single spot material by paper chromatography. One recrystallization from methanol gives 17α,20,20,21 - bis(methylenedioxy)-1ξ-hydroxy-2-oxa-4-pregene-3,11-dione. The infrared spectrum and also the melting point is identical with that of material prepared as described in Example 2.

Example 5

A 500 mg. sample of 17α,20,20,21-bis-methylenedioxy)-1ξ-hydroxy-2-oxa-4-pregnene-3,11-dione, M.P. 227–229° C., is suspended in 50 ml. of 60% aqueous formic acid and heated on a steam bath for one hour. The mixture is cooled and extracted three times with ethyl acetate. The extracts are washed with a solution of sodium carbonate and with a saturated solution of sodium chloride. The extracts are dried and the solvent removed to afford an amorphous solid (290 mg.) which is crystallized from methanol to give a product, M.P. 225–227° C. (micro M.P.). Paper chromatography shows both the crude solid and the crystalline product to be essentially pure 1ξ,17α,21-trihydroxy-2-oxa - 4 - pregnene-3,11,20-trione contaminated by a small amount of a more mobile impurity, presumably a 21-formate. An analytical sample is obtained by descending paper chromatography on Whatman Paper No. 4 (paper chromatography using Whatman paper is described in the Merck Index, 7th edition (1960), pages 1593–4). Formamide-methanol (1:2) is used as the stationary phase and chloroform as the mobile phase. The product is eluted from the dried sheets with methanol. The solvent is removed in vacuo and the residue is taken up in ethyl acetate and washed repeatedly with water. Crystallization of the residue from acetone-n-hexane solution with the aid of Nuchar C-1000-N (a decolorizing charcoal) gives 1ξ,17α,21-trihydroxy-2-oxa-4-pregnene-3,11,20-trione, M.P. 242–244° C., λmax. 223 $m\mu$. ($\epsilon$ = 14,500.) *Analysis.*—Calculated for $C_{20}H_{26}O_7$, C, 3.48; H, 6.93. Found: C, 63.81; H, 7.01.

Example 6

A suspension of 268 mg. of IV (see Flow Sheet A) in 6.75 ml. of 0.0922 N sodium hydroxide is heated on a steam bath under nitrogen for thirty minutes with occasional shaking. The resulting solution of the sodium salt V (see Flow Sheet A) is cooled, diluted with 5 ml. of water and treated with 290 mg. of sodium borohydride at room temperature overnight. A precipitate separates in the course of the reduction. The mixture is cooled and acidified with hydrochloric acid. The product is removed by filtration and washed free of acid to give 200 mg. of a mixture of the C–11 epimeric diols, 17α,20,20,21-bis(methylenedioxy)-11β-hydroxy - 2 - oxa-4-pregene-3-one and 17α,20,20,21-bis(methylenedioxy)-11α-hydroxy-2-oxa-4-pregene-3-one. The mixture is separated by descending paper chromatography using 20 sheets of Whatman Paper No. 4 (paper chromatography using Whatman paper is described in the Merck Index, 7th edition (1960) pages 1593–4). Formamide-methanol (1:2) is used as the stationary phase and benzene-n-hexane (1:1) as the mobile phase. The sheets are dried.

The more mobile zone is eluted with methanol and the extracts are taken to dryness. Water is added, and the product is removed by filtration and washed with water to give 68.0 mg. of the axial isomer, 17α,20,20,21-bis(methylenedioxy)11β-hydroxy-2-oxa - 4 - pregnene-3-one. A 58 mg. aliquot is crystallized from a mixture of acetone and n-hexane to afford 38 mg. of the purified product, M.P. 251–255° C. One further recrystallization gives 30.2 mg. of product, M.P. 253–255° C., $\lambda_{max.}^{MeOH}$ 225 $m\mu$ ($\epsilon$ = 13,500)

The melting point is not improved on one further recrystallization from the same solvent pair. *Analysis.*—Calculated for $C_{22}H_{30}O_7$: C, 65.01; H, 7.44. Found: C, 65.00; H, 7.20.

The less mobile zone is eluted with methanol, and the extracts are taken to dryness. Water is added and the product is removed by filtration and washed with water to give 38.4 mg. of product. This is combined with an additional 120 mg. obtained in the same manner. Crystallization from methanol affords 102 mg. of product, M.P. 269–279.8° C., $\lambda_{max.}^{MeOH}$ 223 m$\mu$ ($\epsilon$ = 13,500)

Two further recrystallizations from methanol gives an analytical specimen of 17$\alpha$,20,20,21-bis(methylenedioxy)-11$\alpha$-hydroxy-2-oxa-4-pregnene-3-one, M.P. 282–285° C., $\lambda_{max.}^{MeOH}$ 223 m$\mu$ ($\epsilon$ = 13,700)

*Analysis.*—Calculated for $C_{22}H_{30}O_7$: C, 65.01; H, 7.44. Found: C, 64.75; H, 7.64.

A 15.4 mg. sample of 17$\alpha$,20,20,21-bis(methylenedioxy)-11$\alpha$-hydroxy-2-oxa-4-pregnene-3-one, M.P. 282–285° C. is treated with 0.3 ml. of pyridine and 0.3 ml. of acetic anhydride at room temperature overnight. The reagents are removed in vacuo and 1 ml. of water is added. The crude product is removed by filtration and purified by recrystallization twice from a mixture of acetone and n-hexane, using decolorizing charcoal in the final recrystallization. The 17$\alpha$,20,20,21-bis(methylenedioxy)-11$\alpha$-acetoxy-2-oxa-4-pregnene-3-one (9.2 mg.), melts at 220–222.8° C., $\lambda_{max.}^{MeOH}$ 221 m$\mu$ ($\epsilon$ = 11,600)

Infrared spectra of the compound shows carbonyl absorption at 5.81 and 5.88$\mu$ (CHCl$_3$); the presence of an acetate is confirmed by a peak at 8.04$\mu$. *Analysis.*—Calculated for $C_{24}H_{32}O_8$: C, 64.27; H, 7.19. Found: C, 64.58; H, 7.44.

*Example 7*

A 54.5 mg. sample of 17$\alpha$,20,20,21-bis(methylenedioxy)-11$\beta$-hydroxy-2-oxa-4-pregnene-3-one is heated in 60% aqueous formic acid on a steam bath for about six minutes. The mixture is cooled and solvents are removed in vacuo. Addition of water gives a solid which is crystallized from water to afford 28.8 mg. of 11$\beta$,17$\alpha$,21-trihydroxy-2-oxa-4-pregnene-3,20-dione, M.P. 212–215° C., $\lambda$max. 223 m$\mu$ ($\epsilon$=12,900). A quantitaitve tetrazolium test shows 105% the extinction shown by hydrocortisone.

The compound is characterized as its 21-acetate which is prepared by dissolving 18 mg. of the 11$\beta$,17$\alpha$-21-trihydroxy-2-oxa-4-pregnene-3,20-dione in 0.3 ml. of pyridine and 0.3 ml. of acetic anhydride. The mixture is kept at room temperature overnight. The solvents are removed in vacuo. The residue is then treated with water and the product is removed by filtration. Crystallization from acetone-n-hexane gives well-defined needles of 11$\beta$,17$\alpha$,21-trihydroxy-2-oxa-4-pregnene-3,20-dione 21-acetate (17.6 mg.), M.P. 194–196° C. One further recrystallization from the same solvent pair gives a M.P. of 189–190° C., $\lambda_{max.}^{MeOH}$ 223 m$\mu$ ($\epsilon$ = 14,700)

*Analysis.*—Calculated for $C_{22}H_{30}O_7$: C, 65.01; H, 7.44. Found: C, 64.90; H, 7.29.

In accordance with the above procedure, but using an equivalent quantity of another acylating agent, in place of acetic anhydride, there is obtained the corresponding 21-acylate.

In accordance with the above procedures, but starting with the 1$\xi$-chloro- or the 1$\xi$-ethylmercapto-17$\alpha$,20,20,21-bis(methylenedioxy)-2-oxa-4-pregnene-3,11-dione there is obtained the corresponding 1$\xi$-chloro- or 1$\xi$-ethylmercapto-17$\alpha$,21-dihydroxy-2-oxa-4-pregnene-3,11,20 - trione 21-acylate.

*Example 8*

A suspension of 0.700 g. of 17$\alpha$,20,20,21-bis(methylenedioxy)-1$\xi$-hydroxy-2-oxa-4-pregnene-3,11 - dione in 4.18 ml. of dry pyridine and 97.2 ml. of dry benzene is chilled in an ice bath and treated with 16.15 ml. of purified thionyl chloride. After standing at room temperature for about thirty minutes, the solution is taken to dryness. Ice water is added to the residue and the product is removed by filtration. The crude product is dissolved in a mixture of formamide and methanol and extracted six times with benzene. The combined benzene extracts are back-extracted successively with formamide, water and a saturated solution of sodium chloride. Removal of the solvent gives substantially pure product (557 mg.), M.P. about 225–228° C. An analytical sample of 17$\alpha$,20,20,21-bis(methylenedioxy)-1$\xi$-chloro-2-oxa - 4 - pregnene-3,11-dione, M.P. 225–227° C. $[\alpha]_D^{CHCl_3}$+104° C., $\lambda$max. 228 m$\mu$ ($\epsilon$=13,500), is prepared by recrystallization from acetone-water, using Nuchar C-190 N (a decolorizing charcoal) to remove traces of colored impurities. *Analysis.*—Calculated for $C_{22}H_{27}O_7Cl$: C, 60.20; H, 6.20. Found: C, 60.57; H, 6.19.

A mixture of 38.0 mg. of 17$\alpha$,20,20,21-bis (methylenedioxy)-1$\xi$-chloro-2-oxa-4-pregnene-3,11-dione, 0.78 ml. of acetic acid and 0.39 ml. of water is heated with 67.5 mg. of chromous acetate on a steam bath under nitrogen with constant stirring. The mixture is cooled, diluted with water and extracted with chloroform. The product is identical with 17$\alpha$,20,20,21-bis(methylenedioxy)-1$\xi$-hydroxy-2-oxa-4-pregnene-3,11-dione.

*Example 9*

A solution of 436 mg. of the unsaturated ester-aldehyde IV (see Flow Sheet B), M.P. 230.8–233° C., in 32 ml. of ethanol and 40 ml. of benzene is reduced over 300 mg. of platinum oxide at room temperature and atmospheric pressure until the hydrogen uptake is complete. The product (490 mg.) is crystallized from a mixture of acetone and n-hexane to afford 259 mg. of the saturated ester aldehyde XVI (see Flow Sheet B), M.P. 165–169° C. The infrared spectrum shows no evidence of OH absorption but shows a maximum at 5.78 and a shoulder at 5.85$\mu$. Nuclear magnetic resonance data shows no olefinic proton, but an aldehyde hydrogen at 0.41 tau units and a methoxy proton at 6.25$\tau$. An analytical specimen, M.P. 172–175° C. is obtained by recrystallization from ether - petroleum ether. *Analysis.*—Calculated for $C_{23}H_{32}O_6$: C, 62.28; H, 7.39. Found: C, 62.55; H, 7.49.

The unsaturated ester-aldehyde IV (see Flow Sheet B) (600 mg.) is added to a solution of 13.3 ml. of 0.1 N methanolic sodium methoxide in 50 ml. of ethyl mercaptan and the mixture is stirred at room temperature overnight. The pH of the solution is then adjusted to about 6 with acetic acid. The solvents are removed in vacuo. Residual ethyl mercaptan is largely removed by the repeated addition of petroleum ether and removal of the solvent. The crude product is distributed between chloroform and water. The organic layer is then dried and the solvent removed. Crystallization of the residual oil from a mixture of acetone and n-hexane gives 500 mg. of the acetone solvate which crystallizes in the form of prisms, M.P. 262–265.3° C. One single recrystallization from a mixture of methanol and water gives 17$\alpha$,20,20,21-bis(methylenedioxy) - 1$\xi$ - ethylmercapto - 2 - oxa - 4-pregnene-3,11-dione, M.P. 261.5–265° C. Nuclear magnetic resonance data reveals a $C_1$ proton at 3.64 tau units, a $C_4$ proton at 4.15$\tau$. The peaks at 7.17$\tau$ (quartet) and at 8.65$\tau$ (triplet) indicate the thioether function. *Analysis.*—Calculated for, $C_{24}H_{32}O_7$: C, 62.05; H, 6.94. Found: C, 62.77; H, 6.83.

A sample of Raney nickel catalyst which has been prepared several months earlier is washed repeatedly with water until the washings are neutral and then with ethyl acetate. The resulting reducing agent is suspended in refluxing ethyl acetate for two hours. One-half teaspoon of the catalyst is added to a solution of 50 mg. of 17α,20, 20,21 - bis(methylenedioxy) - 1ξ - ethylmercapto - 2 - oxa-4-pregnene-3,11-dione in ethanol and the mixture is stirred at room temperature for ten minutes. The catalyst is removed by filtration and the filtrate is taken to dryness. The crude product (39 mg.) is devoid of selective absorption in the ultraviolet, but shows strong absorption maxima in chloroform at 7.35μ, 8.5μ and 9.95μ. Crystallization from methanol water affords 17α,20,20, 21 - bis(methylenedioxy) - 1ξ - ethylmercapto - 2 - oxa-pregnane - 3,11-dione, M.P. 200–207° C. *Analysis.—* Calculated for, $C_{24}H_{34}O_7S$: S, 6.9. Found: S, 6.71.

A solution of 435 mg. of 17α,20,20,21-bis(methylenedioxy) - 1ξ - ethylmercapto - 2 - oxa - 4 - pregnene - 3,11-dione, M.P. 259–262° C. in ethanol, is stirred at room temperature with three teaspoons of freshly prepared Raney nickel catalyst for one and one-half hours. The mixture is filtered and the residue extracted repeatedly with hot ethyl acetate. The combined filtrate and washes afford only 164 mg. of crude product. Crystallization from a mixture of acetone and n-hexane gives 17α,20,20,-21 - bis(methylenedioxy) - 2 - oxa - pregnane - 3,11 - dione, which crystallizes in the form of prisms, M.P. 273–275° C. The ultraviolet spectrum shows $$\lambda_{max.}^{CHCl_3} - 5.76\mu$$

with a pronounced shoulder at 5.83; $\lambda_{max}$ 5.76μ; 5.90μ. An analytical specimen, M.P. 276–279.8° C. is prepared by repeated recrystallizations from mixtures of acetone and n-hexane. *Analysis.—*Calculated for, $C_{22}H_{30}O_7$: C, 65.01; H, 7.44. Found: C, 64.76; H, 7.67.

A 10 mg. aliquot of 17α,20,20,21-bis(methylenedioxy)-2-oxa-pregnane-3,11-dione is suspended in 0.16 ml. of 0.1 N aqueous sodium hydroxide and diluted with 3 ml. of water. The mixture is heated on a steam bath for about thirty minutes. The resulting solution is freeze-dried. The product shows a strong absorption maximum at 6:35–6.4μ indicative of the carboxylate anion. Acidification of an aqueous solution of the salt regenerates 17α,20,20,21 - bis(methylenedioxy) - 2 - oxa - pregnane - 3,11-dione.

A 20 mg. aliquot of 17α,20,20,21-bis(methylenedioxy)-1ξ - ethylmercapto - 2 - oxa - pregnane - 3,11 - dione, prepared as described above is heated with 4 ml. of 0.1 N sodium hydroxide on a steam bath for ten minutes but this procedure fails to effect saponification. Addition of 2–3 drops of 2.5 N sodium hydroxide also does not bring the steroid into solution. The insolubles are therefore removed by filtration and dissolved in 3 ml. of methanol. After the addition of about 6 drops of 1.25 N aqueous sodium hydroxide and the mixture is briefly heated on a steam bath. Removal of the methanol in vacuo followed by the addition of water gives a solution of the sodium salt which on acidification with an excess of hydrochloric acid affords an acidic compound (strong hydrogen bonding at 3–4, and 8–3μ). This compound is removed by filtration and washed free of HCl with water. The product is dissolved in methanol and treated with an excess of an ethereal solution of diazomethane to afford a methyl ester identical with compound XVI on Flow Sheet B.

*Example 10*

To a suspension of 25.0 g. of 9,11β-epoxy-17α,21-dihydroxy-16α-methyl-1,4-pregnadiene-3,20-dione in 850 ml. of alcohol-free chloroform cooled to about 5° C. in an ice bath is added with constant stirring 250 ml. of cold, concentrated hydrochloric acid and then 250 ml. of Formalin (low in methanol). The mixture is removed from the ice bath and stirred at room temperature for 24 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid.

A 13.3 g. aliquot of the crude product obtained above, which shows a bromine content of 16.56% (calculated 16.3%) is suspended in 50 ml. of methanol and allowed to react with 29.3 ml. of a 1.01 N methanolic solution of sodium methoxide for 45 minutes. The mixture becomes homogeneous after about 30 minutes, but a precipitate later separates. The pH of the mixture is adjusted to 6 with acetic acid. The precipitate is removed by filtration and washed with methanol to give 7.4 gms. of 17α, 20,20, 21 - bis(methylenedioxy) - 9,11β - epoxy - 16α - methyl-1,4-pregnadiene-3-one, M.P. 205–207° C. Ultraviolet absorption shows that this product is devoid of —OH or saturated —C=O. The filtrate affords an additional 2.75 gms. of product, M.P. 197–201° C. An analytical sample, M.P. 220–221° C., $\lambda_{max.}$ 249.5 mμ ($\epsilon$=15,500) is obtained by chromatography on alumina and subsequent recrystallization from a mixture of acetone and n-hexane. *Analysis.—*Calculated for $C_{24}H_{30}O_6$: C, 69.54; H, 7.30. Found: C, 69.62; H, 7.48.

*Example 11*

A solution of 7.5 g. of crude unchromatographed 17α,20,20,21-bis(methylenedioxy)-9,11β-epoxy - 16α - methyl-1,4-pregnadiene-3-one in 150 ml. of pyridine is treated with a solution of 5.5 g. of osmium tetroxide in 50 ml. of pyridine with external cooling. The mixture is kept at room temperature for one day. Then the mixture of osmate esters is precipitated with n-hexane and removed by filtration. The mixture is dissolved in 700 ml. of dioxane and reduced with hydrogen sulfide at 5° C. for one hour. The osmium dioxide is precipitated by the addition of salt water and the steroid is extracted into chloroform until the organic extracts give a negative tetrazolium test. The crude product obtained after the removal of the solvents is dissolved in ether and filtered to remove additional amounts of inorganic material. The product is then taken up in pyridine and water is added to afford 1.425 g. of a crude mixture.

A 200 mg. aliquot of the above mixture is put on 20 sheets of Whatman Paper No. 4 (paper chromatography using Whatman paper is described in the Merck Index, 7th Edition (1960), pages 1593–4) and chromatographed, using methanol-formamide 2:1 as the stationary phase and benzene-n-hexane 1:1 as the mobile descending phase. The more mobile zone is eluted with methanol and the extracts are taken to dryness. Water is added and the product is removed by filtration and washed with water to give 59.5 mg. of crude 17α,20,20,21-bis(methylenedioxy)-9,11β-epoxy-4ξ,5ξ-dihydroxy-16α-methyl-1 - pregnene - 3-one. Crystallization from a mixture of acetone and petroleum ether gives 20.9 mg. of the purified product, M.P. ca. 230° C., $$\lambda_{max.}^{MeOH}\ 228\ m\mu\ (\epsilon=9,400).$$

The infrared spectra of the compound shows maxima (CHCl₃) at 2.79μ (OH), 2.86 (OH), 5.92 (3-keto) and only a weak bond at 6.16μ characteristic of Δ'-3-ketones. One further recrystallization from the same solvent system apparently gives a different crystalline modification, M.P. 211–215° C.

$$\lambda_{max.}^{MeOH}\ 228\ m\mu\ (\epsilon=9,600)$$

*Analysis.—*Calculated for $C_{24}H_{32}O_8$: C, 64.27; H, 7.19. Found: C, 64.80; H, 7.32.

The less mobile isomeric 17α,20,20,21-bis(methylenedioxy)-9,11β-epoxy-1ξ,2ξ-dihydroxy-16α-methyl-4 - pregnene-3-one is obtained by treating 15 mg. of 17α,20,20,21-bis(methylenedioxy - 9,11β - epoxy - 16α - methyl - 1.4-pregnadiene-3-one in 300 ml. of pyridine with a solution of 10 g. of osmium tetroxide in 100 ml. of pyridine with external cooling. The mixture is kept at room temperature for 3 days. The osmate extract is precipitated with n-hexane and removed by filtration. The mixture is dissolved in 1,400 ml. of dioxane and reduced with hydrogen sulfide at 5° C. for ½ hour. The osmium dioxide is precipitated by the addition of salt water and the steroid is extracted into chloroform until the organic extracts give a negative tetrazolium test. The crude product, obtained after removal of solvents, is dissolved in ether and filtered to remove additional amounts of inorganic material. The product is then taken up in pyridine and water is added to give first 3.8 g. and then a second crop of 2.45 g. of 17α,20,20,21-bis(methylenedioxy)-9,11β-epoxy-1ξ,2ξ-dihydroxy-16α-methyl-4-pregnene-3-one. The recrystallization of the combined fractions from a mixture of acetone and n-hexane gives 2.71 g. of product which is chromatographed on 20 sheets of Whatman Paper No. 3 (paper chromatography using Whatman paper is described in the Merck Index, 7th Edition (1960), pages 1593–4) to give 220 mg. of purified product, M.P. ca. 227–232° C. An analytical sample has the following properties: M.P. 230–232° C. λmax. 242.5 mμ

($\epsilon = 12,500$)

*Analysis.*—Calculated for $C_{24}H_{32}O_8$: C, 64.27; H, 7.19. Found: C, 64.37; H, 7.29.

Example 12

A solution of 220 mg. of 17α, 20,20,21-bis(methylenedioxy)-9,11β-epoxy-1ξ,2ξ-dihydroxy-16α-methyl-4-pregnene-3-one in 32 ml. of methanol is allowed to react with a solution of 760 mg. of sodium metaperiodate in 12 ml. of water with stirring at room temperature overnight. The bulk of the material is removed in vacuo and the residue is distributed between water and a mixture of chloroform and ether. The organic layer affords 215 mg. of crude 17α,20,20,21-bis(methylenedioxy)-9,11β-epoxy-1ξ-hydroxy-16α-methyl-2-oxa-4-pregnene-3-one, λmax. 227.5 mμ ($\epsilon=9,200$). The product is purified by paper chromatography using formamide as the stationary phase and benzene-hexane as the mobile component. The major component ($r_f$ 0.12) is isolated from paper by eluting with methanol and then taking the extracts to dryness. Water is then added and the product is removed by filtration and then washed with water to give 54.0 mg. of product. This is crystallized from a mixture of acetone and n-hexane to yield 40 mg. of 17α,20,20,21-bis(methylenedioxy)-9,11β-epoxy-1ξ-hydroxy-16α-methyl-2-oxa-4-pregnene-3-one which has the following properties: M.P. 264–266° C. dec. λmax. 228 mμ ($\epsilon=11,230$). *Analysis.*—Calculated for $C_{23}H_{30}O_8$: C, 63.58; H, 6.96. Found: C, 63.35; H, 6.91.

Example 13

A 100 mg. sample of 17α,20,20,21-bis(methylenedioxy)-9,11β-epoxy-1ξ-hydroxy-16α-methyl-2-oxa-4-pregnene-3-one, M.P. 265–266° C. is dissolved in 15 ml. of methanol with heating. The solution is cooled and treated with 2.18 ml. of 0.1020 N aqueous solution of sodium hydroxide. The pH of the solution is adjusted to 9 by the addition of several drops of the aqueous base and the bulk of the material is then removed in vacuo. The residual solution (pH ca. 9) is treated with 1 ml. of saturated solution of sodium chloride. The resulting precipitate is just redissolved with water and 110 mg. of sodium borohydride is added. The mixture is kept at room temperature overnight during which time a solid separates. The mixture (pH=10) is made acid to Congo red with 2.5 N hydrochloric acid solution and the product is isolated by filtration. The crude material (90 mg.) ($r_f=0.84$ formamide-benzene-n-hexane 1:1 system), $$\lambda_{max.}^{CH_3OH} \ 225 \ m\mu \ (\epsilon=9,800)$$

is crystallized from a mixture of acetone and n-hexane to give 51.0 mg. of 17α,20,20,21-bis(methylenedioxy)-9,11β-epoxy-16α-methyl-2-oxa-4-pregnene-3-one, M.P. ca. 225–228° C. λmax. 225 mμ. An analytical specimen obtained after two further recrystallizations from the same solvent pair has a M.P. of 225–228° C. *Analysis.*—Calculated for $C_{23}H_{30}O_7$: C, 66.01; H, 7.23. Found: C, 65.97; H, 7.32.

Example 14

A solution of 120 mg. of 17α,20,20,21-bis(methylenedioxy)-9,11β-epoxy-16α-methyl-2-oxa-4-pregnene-3-one in a mixture of 28.8 ml. of 50% aqueous acetic acid and 2.4 ml. of concentrated hydrochloric acid is heated on a steam bath under nitrogen for 4 minutes. The mixture is poured into water and extracted with chloroform and ethyl acetate. The combined organic layers are washed with water and then with a 5% solution of sodium bicarbonate. The mixture is again washed with water and taken to dryness to give 85.1 mg. of product, a major component of which is 9α-chloro-11β,17α,21-trihydroxy-16α-methyl-2-oxa-4-pregnene-3,20-dione. The purified compound (21.3 mg.) is isolated by paper chromatography using formamide as the stationary phase and chloroform as the mobile component.

The 21-acetate is prepared by adding 21.3 mg. of 9α-chloro-11β,17α,21-trihydroxy-16α-methyl-2-oxa-4-pregnene-3,20-dione to 0.2 ml. of pyridine and 0.2 ml. of acetic acid and letting stand at room temperature overnight. The product is purified by paper chromatography, using the formamide-benzene system and then crystallized from a mixture of acetone and n-hexane to give 5.4 mg. of 9α-chloro-11β,17α,21-trihydroxy-16α-methyl-2-oxa-4-pregnene-3,20-dione 21-acetate, M.P. 178–182° C. dec., λmax. 223 mμ ($\epsilon=13,400$). *Analysis.*—Calculated for $C_{23}H_{31}O_8Cl$: Cl, 7.5. Found: 8%. A quantitative assay for the 20-keto-21-acyloxy system with tetrazolium reagent gives 96% of the extinction of 9α-chloro-11β,17α,21-trihydroxy-16α-methyl-1,4-pregnadiene-3,20-dione 21-acetate.

In accordance with the above procedures, but using concentrated hydrobromic acid in place of concentrated hydrochloric acid in the first step, there is obtained the 9α-bromo-11β,17α,21-trihydroxy-16α-methyl-2-oxa-4-pregnene-3,20-dione and the 21-acetate thereof.

To a stirred solution of 100 mg. of 9α-chloro-11β,17α,21-trihydroxy-16α-methyl-2-oxa-4-pregnene-3,20-dione 21-acetate in 3 ml. of tetrahydrofuran and 1 ml. of methanol under nitrogen is added 1.02 ml. of 0.215 N methanolic sodium methoxide. After 10 minutes at 20° C., 0.2 ml. of acetic acid is added and the methanol removed in vacuo to give a residue which is the 9,11β-epoxy-17α,21-dihydroxy-16α-methyl-2-oxa-4-pregnene-3,20-dione.

To a solution of 200 mg. of 9,11β-epoxy-17α,21-dihydroxy-16α-methyl-2-oxa-4-pregnene-3,20-dione in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is extracted with chloroform and the latter phase is washed with water and dried over magnesium sulfate. The residue on crystallization from a mixture of acetone and ether gives 9α-fluoro-11β,17α,21-trihydroxy-16α-methyl-2-oxa-4-pregnene-3,20-dione.

To a solution of 100 mg. of 9α-fluoro-11β,17α,21-trihydroxy-16α methyl-2-oxa-4-pregnene-3,20-dione in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqeuous layer is 1–3), saturated aqueous sodium bicarbonate (until the pH of the aqueous layer is 8), and water (until the aqueous layer is neutral). The ethyl actate solution is dried with anhydrous sodium sulfate. The solvent is then distilled at about 40° C. in vacuo to afford the 21-acetate which is isolated by the addition of water and filtration.

In accordance with the above procedure, but using an equivalent quantity of another acylating agent in place of acetic anyhdride, there is obtained the corresponding 21-acylate.

Example 15

A solution of 400 mg. of 9α-chloro-11β,17α,21-trihydroxy-16α-methyl-2-oxa-4-pregnene-3,20-dione 21-acetate in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 9α-chloro-17α,21-dihydroxy-16α-methyl-2-oxa-4-pregnene-3,11,20-trione 21-acetate.

In accordance with the above procedure, but starting with any of the other 11β-hydroxy-steroids listed as products in columns 2, 3 and 4, there is obtained the corresponding 11-keto-steroid.

Example 16

A mixture of 38 g. of 9α-fluoro-11β,17α-21-trihydroxy-16α-methyl-1,4-pregnadiene-3,20-dione, 1.87 liters of chloroform, 0.75 liter of concentrated hydrochloric acid and 0.75 liter of reagent formaldehyde is stirred at room temperature for one hour. The layers are separated and the aqueous phase is back-extracted with chloroform. The combined chloroform extracts are washed twice with a 5% solution of sodium bicarbonate and twice with a saturated solution of sodium chloride. After drying over magnesium sulfate, the mixture is concentrated to near dryness. Methanol is added and the mixture is again taken to near dryness. The product which is transferred to a funnel with the aid of methylene chloride and methanol melts at about 295° C. dec. and in the infrared shows saturated carbonyl peaks but only OH (2.95μ), A-ring chromaphore (6.02μ; 6.19μ) and bis (methylenedioxy) absorption (9.15–9.25μ, all in Nujol). A 5 g. aliquot is dissolved in a refluxing mixture of 750 ml. of acetone and 200 ml. of methanol. The solution is filtered and diluted with water to give 17α,20,20,21-bis(methylenedioxy)-9α-fluoro-11β-hydroxy-16α-methyl-1,4-pregnadiene-3-one, M.P. about 315° C. dec.

Example 17

A solution of 14.95 g. of 17α,20,20,21-bis(methylenedioxy)-9α-fluoro-11β-hydroxy-16α-methyl-1,4-pregnadiene-3-one in 290 ml. of pyridine is cooled to 5° C. and treated with a solution of 9.6 g. of osmium tetroxide in 6 ml. of pyridine for four days. The mixture is then added with stirring to 2 liters of petroleum ether. The crude osmate ester is isolated by filtration, and washed with petroleum ether to remove most of the residual pyridine. The crude product is then dissolved in 1.2 liters of dioxane and kept in an ice-bath while a slow stream of hydrogen sulfide is bubbled through the reaction mixture. The precipitated osmium dioxide is removed by filtration, and the filtrate is concentrated to dryness in vacuo. The residual foam is dissolved in 0.3 liter of acetone, decolorized with activated carbon, filtered and concentrated to a volume of about 0.14 liter. Addition of 0.14 liter of n-hexane affords 3.75 g. of 17α,20,20,21-bis(mehylenedioxy)9α-fluoro-4ξ,5ξ-dihydroxy-16α-methyl-1-pregnene-3,11-dione, M.P. ca. 292–296° C. λmax. 227.5 (ε=9,300). The compound gives a positive tetrazolium test and a negative ferric chloride test. The molecular extinction is only about 12% of that given by compound 17α,20,20,21-bis(methylenedioxy)-1ξ,2ξ-dihydroxy-4-pregnene-3,11-dione. Further recrystallization from mixtures of pyridine and water, and from mixtures of methylene chloride and ether does not substantially change the M.P. (297–300° C.) nor the ultraviolet spectrum. The solid state infrared spectrum of the product shows hydroxyl absorption (2.85–3.0μ), an unsaturated carbonyl system (5.94μ and 6.15μ), and a saturated carbonyl peak at 5.82μ. The crude crystalline product is satisfactory for use in the subsequent step.

Example 18

A solution of 300 mg. of the crude, crystalline 17α,20,20,21-bis(methylenedioxy)-9α-fluoro-4ξ,5ξ-dihydroxy-16α-methyl-1-pregnene-3,11-dione in about 100 ml. of benzene-methanol (4:1) is treated with 1.2 g. of lead tetraacetate for 18 hours at room temperature. After addition of oxidizing agent, the mixture acquires a red color which disappears on standing. An equal volume of benzene is added and the mixture is then washed several times with water. Removal of the solvent and crystallization from methanol affords 280 mg. of a compound $C_{24}H_{31}O_8F$ which is compound IVA″ or IVB″ of Flow Sheet D. This compound shows end absorption but no selective absorption between 215 mμ and 280 mμ; at 215 mμ ε is about 6,700. One crystallization from acetone-n-hexane gives prisms (155 mg.) M.P. 270–277° C. (dec.). An analytical specimen, obtained by recrytallization from acetone-methanol, melts at 281–284° C. (dec.) Analysis.—Calculated for $C_{24}H_{31}O_8F$: C, 61.79; H, 6.70; F, 4.07. Found: C, 62.16; H, 6.95; F, 4.12.

A sample M.P. 275–283° C., obtained by recrystallization from acetone-n-hexane confirms the presence of a methoxy group. Analysis.—Calculated for $OCH_3$: 6.6. Found: 6.65. Nuclear magnetic resonance data reveals no aldehydic proton, but olefinic protons at 3.59 and 3.81 and the methoxy protons at 6.29$^\tau$. The infrared spectrum shows $\lambda_{max}^{CHCl_3}$ 5.79μ, 6.06μ. λno max. 5.82μ, 6.06μ; shoulders at 5.78μ and 5.99 (Nujol).

Example 19

About 290 mg. of the lead tetraacetate oxidation product of Example 18 is suspended in 45 ml. of methanol and refluxed under nitrogen with 3.45 ml. of 1 N sodium hydroxide and 15 ml. of water for about 1½ hours. The mixture is then kept at room temperature overnight. The methanol is removed in vacuo, water is added, and the neutral steroid sodium salt is extracted with methylene chloride and then with ether. The aqueous solution is acidified with dilute hydrochloric acid and the product is removed by filtration and washed with water until free of acid to afford 17α,20,20,21-bis(methylenedioxy)-9α-fluoro-5ξ-hydroxy-16α-methyl-4-oxa-1-pregnene-3,11,-dione.

Example 20

About 280 mg. of 17α,20,20,21-bis-(methylenedioxy)-9α-fluoro-5ξ-hydroxy-16α-methyl-4-oxa-1-pregnene-3,11-dione is nearly dissolved in 7 ml. of 0.1020 N sodium hydroxide with heating. The mixture is then cooled, treated with 350 mg. of sodium borohydride and kept at room temperature under nitrogen overnight. The mixture is cooled, acidified with dilute hydrochloric acid and the product is removed by filtration to give 17α,20,20,21-bis(methylenedioxy)-9α-fluoro-11β-hydroxy-16α-methyl-4-oxa-1-pregnene-3-one.

Example 21

A slurry of 970 mg. of 17α,20,20,21-bis-(methylenedioxy)-9α-fluoro-11β - hydroxy - 16α - methyl - 4 - oxa - 1-pregnene-3-one in 97 ml. of 60% formic acid is purged six times with nitrogen and then heated at 93–95° C. for 15 minutes under nitrogen. The solution is cooled in an ice bath and then 100 ml. of water is added. About 20 g. of sodium carbonate is added portionwise and the resulting precipitate is extracted with chloroform. The chloroform solution is washed acid free with saturated sodium bicarbonate solution and then is washed with water. The chloroform is removed in vacuo and the residue is flushed with 20 ml. of methanol and then concentrated in vacuo to dryness. The crude product at this point contains approximately 10–15% of the 21-formate.

The crude product is dissolved in 45 ml. of purified methanol and purged 6 times with nitrogen. After adding 1.43 ml. of 0.21 M sodium methoxide in methanol (about 12% of theory), the solution is stirred for 7 minutes at 20–25° C. under nitrogen. The solution is then acidified with 3–4 drops of acetic acid. Fve ml. of water and 500 mg. of activated carbon (Darco G–60) are then added and the mixture is stirred at room temperature for 20 minutes. After filtering off the carbon, 40 ml. of water is added and the solution is concentrated in vacuo until essentially no methanol is present. The residual material is filtered again, dried and crystallized from ethyl acetate to give 9α-fluoro-11β,17α,21-trihydroxy-16α-methyl-4-oxa-1-pregnene-3,20-dione.

To a solution of 100 mg. of 9α-fluoro-11β,17α,21-trihydroxy-16α-methyl-4-oxa-1-pregnene-3,20-dione in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo. The product is then crystallized from a solvent; alternately, the product may be chromatographed on alumina and the 9α-fluoro-11β,17α,21-trihydroxy-16α-methyl-4-oxa-1-pregnene-3,20-dione 21-acetate which is isolated by the addition of water and filtration.

In accordance with the above procedure, but using an equivalent quantity of another acylating agent, in place of the acetic anhydride, there is obtained the corresponding 21-acylate.

Various changes and modifications may be made in carrying out the present invention without departing from the spirit and scope thereof. Insofar as these changes and modifications are within the purview of the annexed claims, they are to be considered as part of our invention.

We claim:

1. A compound of the following structural formula:

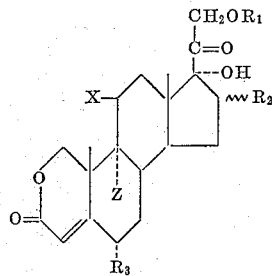

wherein $R_1$ is selected from the group consisting of hydrogen and lower hydrocarbon carboxylyl, $R_2$ is selected from the group consisting of hydrogen, α-methyl and β-methyl, $R_3$ is selected from the group consisting of hydrogen, chloro, fluoro and methyl, X is selected from the group consisting of 11β-hydroxy and keto and Z is selected from the group consisting of hydrogen, chloro, bromo and fluoro.

2. A compound of the following structural formula:

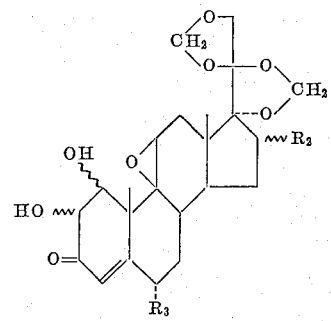

wherein $R_2$ is selected from the group consisting of hydrogen, α-methyl and β-methyl, and $R_3$ is selected from the group consisting of hydrogen, chloro, fluoro and methyl.

3. A compound of the following structural formula:

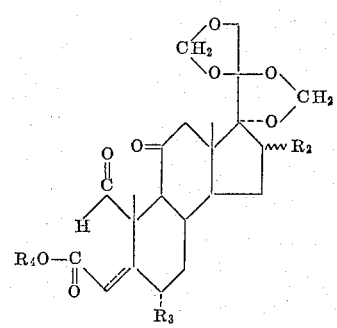

wherein the linkage indicated by the broken line at the 5–6 position is a member of the class consisting of single and double bond linkages, and wherein $R_2$ is a member of the group consisting of hydrogen, α-methyl and β-methyl, $R_3$ is a member of the group consisting of hydrogen, chloro, fluoro and methyl, and $R_4$ is a member of the group consisting of hydrogen, methyl and alkali metal.

4. A compound of the following structural formula:

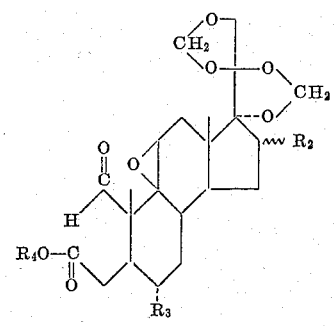

wherein $R_2$ is a member of the class consisting of hydrogen, α-methyl and β-methyl, $R_3$ is a member of the class consisting of hydrogen, chloro, fluoro and methyl, and $R_4$ is a member of the class consisting of hydrogen and an alkali metal.

5. A compound of the following structural formula:

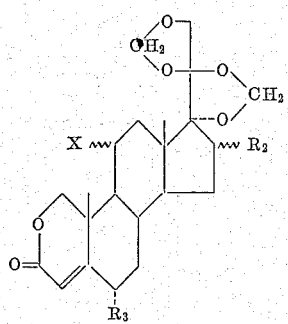

wherein X is a member of the group consisting of α-hydroxy, α-acetoxy and β-hydroxy, $R_2$ is a member of the group consisting of hydrogen, α-methyl and β-methyl, and $R_3$ is a member of the group consisting of hydrogen, fluoro, chloro and methyl.

6. A compound of the following structural formula:

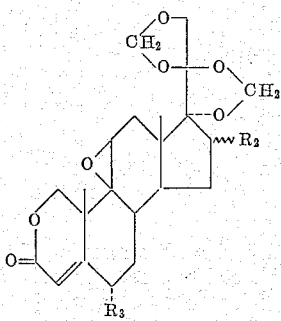

wherein $R_2$ is selected from the group consisting of hydrogen, β-methyl and α-methyl, and $R_3$ is selected from the group consisting of hydrogen, chloro, fluoro and methyl.

7. A compound having the following structural formula:

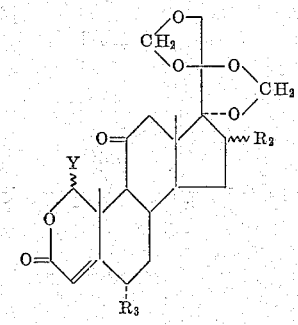

wherein $R_2$ is a member of the group consisting of hydrogen, α-methyl and β-methyl, $R_3$ is a member of the group consisting of hydrogen, methyl, chloro and fluoro, and Y is a member of the group consisting of hydrogen, hydroxy, chloro and ethyl-mercapto.

8. A compound having the following structure:

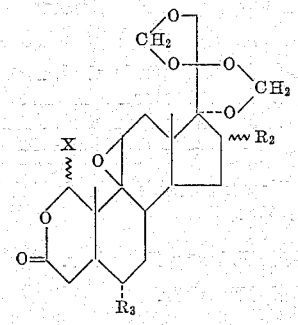

wherein $R_2$ is a member of the group consisting of hydrogen, α-methyl and β-methyl, $R_3$ is a member of the group consisting of hydrogen, methyl, chloro and fluoro, and X is a member of the group consisting of hydrogen and hydroxy.

9. A compound selected from the group consisting of 9α-chloro-17α,21-dihydroxy-16α-methyl-2 - oxa - 4 - pregnene-3,11,20-trione and the 21-lower hydrocarbon carboxylic acylate thereof.

10. A compound selected from the group consisting of 11β,17α,21-trihydroxy-2-oxa-4-pregnene - 3,20 - dione and the 21-lower hydrocarbon carboxylic acylate thereof.

11. A compound selected from the group consisting of 1ξ,17α,21-trihydroxy-2-oxa-4-pregnene-3,11,20-trione and the 21-lower hydrocarbon carboxylic acylate thereof.

12. A compound selected from the group consisting of 1ξ-chloro-17α,21-dihydroxy-2-oxa-4 - pregnene - 3,11,20-trione and the 21-lower hydrocarbon carboxylic acylate thereof.

13. A compound selected from the group consisting of 1ξ-ethylmercapto-17α,21-dihydroxy-2-oxa - 4 - pregnene-3,11,20-trione and the 21-lower hydrocarbon carboxylic acylate thereof.

14. A compound selected from the group consisting of 9α-chloro-11β,17α,21-trihydroxy-16α-methyl - 2 - oxa - 4-pregnene-3,20-dione and the 21-lower hydrocarbon carboxylic acylate thereof.

15. A compound selected from the group consisting of 9α-bromo-11β,17α,21-trihydroxy-16α-methyl - 2 - oxa - 4-pregnene-3,20-dione and the 21-lower hydrocarbon carboxylic acylate thereof.

16. A compound selected from the group consisting of 9α-fluoro-11β,17α,21-trihydroxy-16α-methyl - 2 - oxa - 4-pregnene-3,20-dione and the 21-lower hydrocarbon carboxylic acylate thereof.

17. A compound selected from the group consisting of 9α-fluoro-11β,17α,21-trihydroxy-16α-methyl - 4 - oxa - 1-pregnene-3,20-dione and the 21-lower hydrocarbon carboxylic acylate thereof.

18. The process which comprises reacting a compound having the following structure:

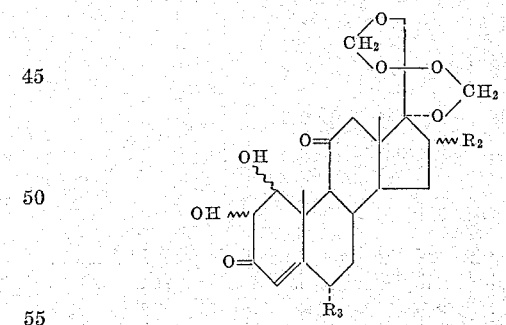

wherein $R_2$ is a member of the group consisting of hydrogen, α-methyl and β-methyl, and $R_3$ is a member of the group consisting of hydrogen, methyl, chloro and fluoro, with lead tetraacetate to form a compound having the structure:

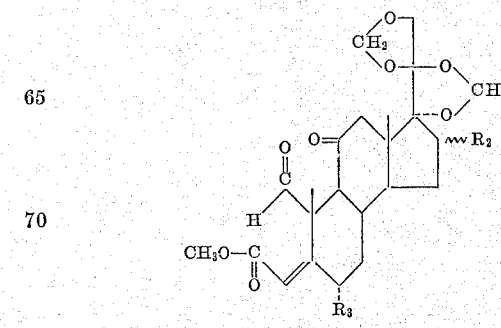

wherein $R_2$ and $R_3$ have the meaning above defined, and reacting this compound with an alkali metal hydroxide to form a compound of the following structure:

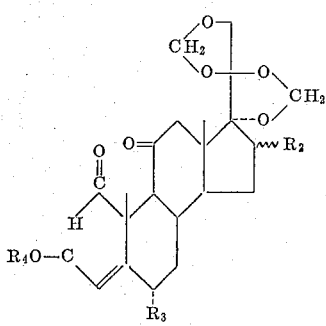

wherein $R_2$ and $R_3$ have the meaning above defined and wherein $R_4$ is an alkali metal.

19. The process which comprises reacting a compound having the following structure:

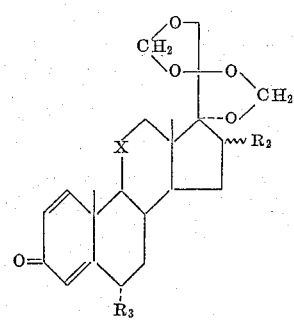

wherein X is a member of the group consisting of

and

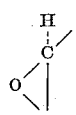

$R_2$ is a member of the group consisting of hydrogen, α-methyl and β-methyl, and $R_3$ is a member of the group consisting of hydrogen, chloro, fluoro and methyl, but hydrogen is present at not more than one of the two positions, $R_2$, and $R_3$ when X is keto, with osmium tetroxide to form a compound having the following formula:

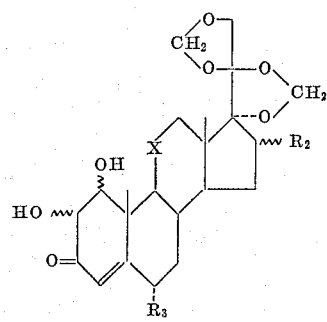

wherein X, $R_2$ and $R_3$ have the meaning above defined, and reacting this compound with lead tetraacetate to form a compound having the structure:

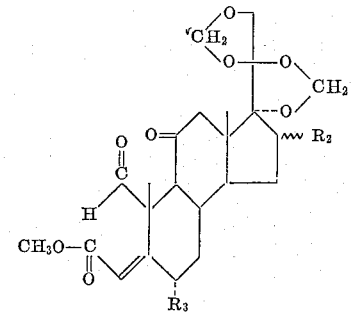

wherein $R_2$ and $R_3$ have the meaning above defined, and reacting this compound with an alkali metal hydroxide to form a compound of the following structure:

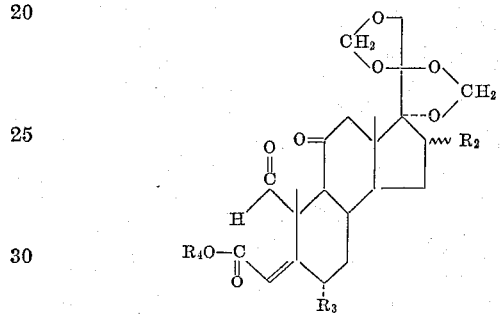

wherein $R_2$ and $R_3$ have the meaning above defined and $R_4$ is an alkali metal and reacting this compound with sodium borohydride to form a compound having the structure:

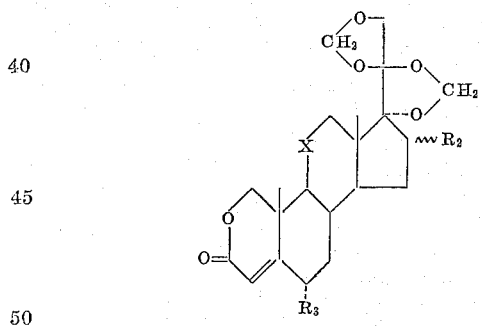

wherein X is selected from the group consisting of

and

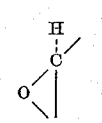

and $R_2$ and $R_3$ have the meaning above defined.

References Cited by the Examiner

UNITED STATES PATENTS

| | | | |
|---|---|---|---|
| 2,951,074 | 8/60 | Chemerda et al. | 260—239.55 |
| 3,023,227 | 2/62 | Atwater | 260—343.2 XR |
| 3,083,198 | 3/63 | Chemerda et al. | 260—239.55 |

OTHER REFERENCES

Fieser and Fieser: Steroids (1959), Reinhold Pub. Co., New York, p. 698.

LEWIS GOTTS, *Primary Examiner.*

L. H. GASTON, *Examiner.*